United States Patent

[11] 3,566,219

[72] Inventors Carroll E. Nelson
Dallas, Tex.;
Hans R. Camenzind, Los Altos; Albert P.
Youmans, Cupertino, Calif.

[21] Appl. No. 791,657
[22] Filed Jan. 16, 1969
[45] Patented Feb. 23, 1971
[73] Assignee Signetics Corporation
Sunnyvale, Calif.

[54] PINCHED RESISTOR SEMICONDUCTOR STRUCTURE
4 Claims, 12 Drawing Figs.

[52] U.S. Cl. .......... 317/235, 317/234, 148/186
[51] Int. Cl. .......... H01l 11/14, H01l 9/00
[50] Field of Search .......... 317/235, 21, 22.1

[56] References Cited
UNITED STATES PATENTS

| | | | |
|---|---|---|---|
| 3,254,280 | 5/1966 | Wallace | 317/237 |
| 3,210,677 | 10/1965 | Lin et al. | 317/235 |
| 3,275,911 | 9/1966 | Onodera | 317/235 |
| 3,443,172 | 5/1969 | Koepp | 317/235 |

*Primary Examiner*—John W. Huckert
*Assistant Examiner*—B. Estrin
*Attorney*—Flehr, Hohbach, Test, Albritton & Herbert

ABSTRACT: Pinched resistor semiconductor structure having a channel and a field plate to provide a depletion region which pinches off the channel so that the current flow remains constant for any voltage after a predetermined voltage is reached.

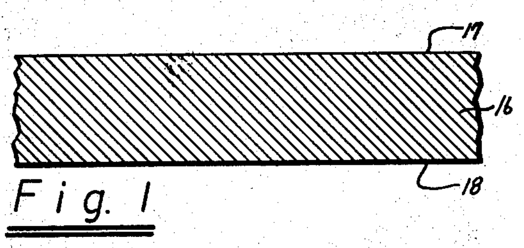
Fig. 1
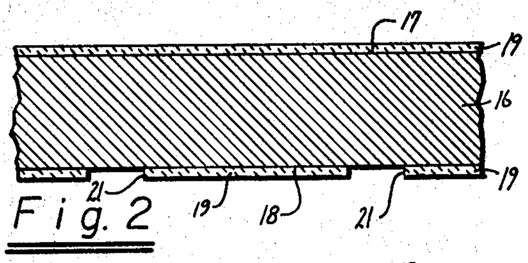
Fig. 2
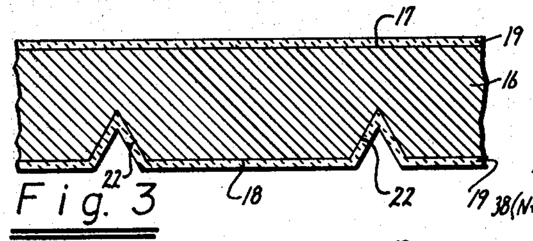
Fig. 3
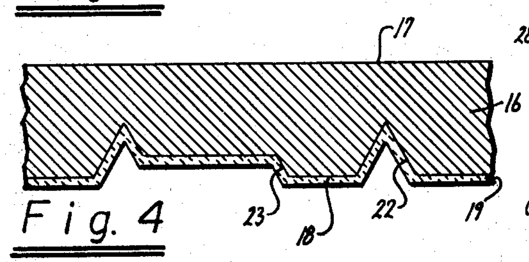
Fig. 4
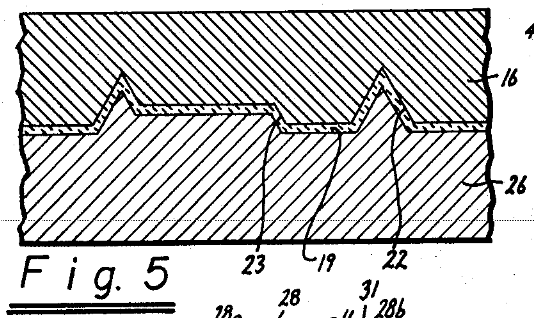
Fig. 5
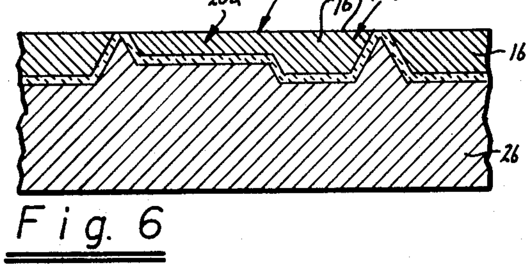
Fig. 6
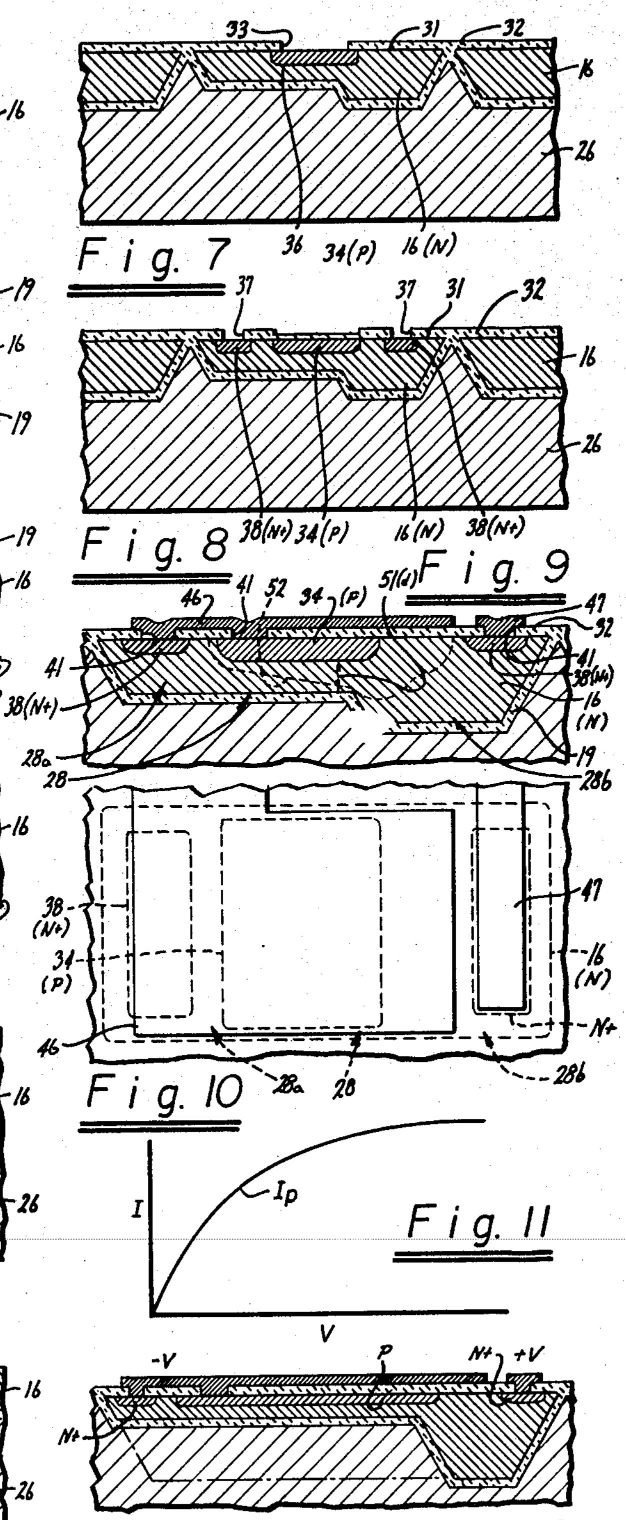
Fig. 7, Fig. 8, Fig. 9, Fig. 10, Fig. 11
Fig. 12
INVENTORS
Carroll E. Nelson
Hans R. Camenzind
Albert P. Youmans
BY Flehr, Hohbach, Test, Albritton & Herbert
Attorneys

PINCHED RESISTOR SEMICONDUCTOR STRUCTURE

BACKGROUND OF THE INVENTION

In copending application Ser. No. 791,660 filed Jan. 16, 1969, there is disclosed a bulk resistor which is satisfactory for low values of resistance but when it is desired to obtain resistances which are greater than 100 kilohms in resistance, they become rather large. Thin film resistors which have been utilized for obtaining high values of resistance are relatively expensive and require additional processing steps, some of which are critical. There is therefore a need for a new and improved resistor which has high values of resistance and which is compatible with the steps utilized in making integrated circuits.

SUMMARY OF THE INVENTION AND OBJECTS

The pinched resistor structure comprises a support body with a semiconductor island carried by the support body and which has a planar surface. The island is characterized in that it has a relatively shallow channel at one end which has a depth which is substantially less than the remaining portion of the island. Contact elements are provided which make contact with the island with one of the contact elements being disposed in the channel. Means is provided between the two contact elements for creating a depletion region which goes to the depth of the channel so that it is completely pinched off to thereby cause the current to remain constant independent of voltage. This means includes a region of opposite conductivity formed within the island with a field plate overlying the region of opposite conductivity and extending beyond the same.

In general, it is an object of the present invention to provide a pinched resistor structure which makes it possible to obtain relatively high values of resistance.

Another object of the invention is to provide a pinched resistor structure of the above character which is compatible with present-day integrated circuitry.

Another object of the invention is to provide a structure of the above character which is relatively simple.

Additional objects and features of the invention appear from the following description in which the preferred embodiments are set forth in detail in conjunction with the accompanying drawings.

BRIEF DESCRIPTION OF THE DRAWINGS

FIGS. 1 through 9 are cross-sectional views showing the method utilized in making a pinched resistor in accordance with the present invention.

FIG. 10 is a plan view of the pinched resistor shown in FIG. 9.

FIG. 11 is a graph showing the manner in which the pinch-off current $I_p$ remains constant after a predetermined voltage is reached.

FIG. 12 is a cross-sectional view similar to FIG. 9 showing a pinch resistor which would have a relatively low value of pinch-off current.

DESCRIPTION OF THE PREFERRED EMBODIMENT

The pinched resistor is formed by taking a wafer of a suitable semiconductor material, such as monocrystalline or single crystalline silicon 16. This silicon wafer 16 can be doped with a suitable impurity such as an N-type impurity if desired. The top and bottom surfaces 17 and 18 are ground flat and parallel. Thereafter, the wafer is placed in an oxidizing atmosphere to form insulating layers 19 on the surfaces 17 and 18. When the semiconductor body 16 is formed of silicon, the insulating layers 19 will be formed of silicon dioxide.

Windows 21 are then opened through the oxide layer 19 on the surface 18 to expose the surface 18. The wafer 16 is then placed in a suitable etch such as an anisotropic etch to form grooves or recesses 22 in the semiconductor body 16. When an anisotropic etch is utilized, the grooves or recesses take a V-shaped configuration in cross section as shown in FIG. 3. After the grooves or recesses 22 have been formed, the oxide 19 is stripped and regrown. Thereafter a large window (not shown) is formed in the oxide 19 from one of the grooves or recesses 22 to a point somewhere between the two adjacent recesses 22. The wafer 16 is again placed in an anisotropic etch and the etching is carried out for a period of time depending upon the depth of the channel desired, as hereinafter explained but which should be less than the depth to which the recesses 22 had been previously etched. After this etching step has been completed to form the large recess 23 which joins one of the V-shaped recesses 22 previously formed, the oxide is again stripped and regrown over the entire surface as shown in FIG. 4.

A support body 26 is then provided on the oxide layer 19 adjacent the surface 18 in a suitable manner, for example, polycrystalline silicon can be deposited on the oxide 19 in a manner well known to those skilled in the art to provide a support structure 26 which fills the grooves or recesses 22 and the large recess 23.

The structure shown in FIG. 5 is then placed in a lapping machine to remove the undesired portions of the semiconductor body 16. The semiconductor body 16 is lapped and polished until the silicon dioxide layer formed in the recesses 22 is exposed through the top side to provide islands 28 (see FIG. 6) of semiconductor material which are carried by the support body 26 and which are insulated from each other and from the support body by the dielectric insulating layer 19 formed of silicon dioxide. It can be seen that the one island 28 which is shown in FIG. 6 is provided with a relatively elongate portion 28*a* which has a thickness which is substantially less than the remaining portion 28*b* of the island 28, which will be utilized for the fabrication of the pinched resistor hereinafter described. The island 28 is provided with a planar surface 31 which lies in the same plane as the other surfaces of the other islands. An insulating or masking layer 32 is formed on the surface 31 in a suitable manner by placing the structure shown in FIG. 6 in an oxidizing atmosphere to provide a silicon dioxide layer 32. Thereafter, a window 33 is formed in the oxide layer by suitable photolithographic techniques and an impurity of a conductivity opposite to that of the island is diffused through the window 33 to provide a region 34 of opposite conductivity and a dish-shaped PN junction which extends to the surface 31. The oxide layer 32 is then regrown over the window area 33 during the diffusion of the region 34 of opposite conductivity. First and second windows 37 are then provided in the oxide layer 32 with one of the windows being adjacent to the extreme end of the channel portion 28*a* and the other being at the extreme end of the thicker portion 28*b*. Thereafter an N+ impurity is diffused through the windows 37 to form contact regions 38 in the island 28.

Windows 41 are then formed in the oxide layer overlying the P-type region 34 and the N+ regions 38. Metallization in the form of aluminum is then deposited over the insulating layer 32 and into the windows 41 to make contact with the N+ and P regions. The undesired metal is then removed by photolithographic techniques so that there remains a first lead structure 46 which is in contact with the N+ region in the shallow portion 28*a* of the island 28 and which continues over and is in contact with the P region 34. In addition, the lead structure 46 is of such a size that it covers the entire P-type region and extends outwardly beyond the same to serve as a field plate to enlarge the depletion region as hereinafter described. The second lead structure 47 makes contact with the other N+ region overlying the thicker portion 28*b* of the island 28.

By way of example, the pinched resistor shown in FIGS. 9 and 10 can have a width of approximately 100 microns and a length of 50—500 microns. A channel 51 (see FIG. 9) is formed between the P-type diffused region 34 and the insulating layer 19 and has a depth which is determined by the pinch-off voltage desired. Typically for the geometry above given, this can range 9 to 14 microns.

The pinch-off voltage can be found from the following formula:

$$V_D = \frac{N.p.d^2}{2.\epsilon_0.\epsilon} = e.g.\ 15\text{–}30\ V$$

where $N$ = the resistance of the material, e.g. 25 to 35 Ohm-centimeters $q$ = electron charge $d$ = depth of the channel $\epsilon 0$ = permittivity of free space $\epsilon$ = relative dielectric constant (of silicon)

The pinch-off current is proportional to the pinch-off voltage and the channel resistance as set forth in the formula below:

$$I_D = \frac{V_D}{3R_{ch}}$$

Where $R_{ch}$ is the channel resistance

In operating the pinched resistor which is shown in FIGS. 9 and 10, a voltage is applied to the two lead structures 46 and 47 which causes a depletion layer 52 to be formed in the channel region under the field plate. As the voltage increases, the depletion layer becomes wider and deeper and begins to pinch off the channel progressively as the voltage is increased. This continues until the voltage is sufficient to cause the depletion layer to penetrate the entire channel thickness to reach the insulating layer 19 as shown in FIG. 9. From this point on the current is constant regardless of the voltage applied to the terminals. The voltage current relationship is shown in the graph in FIG. 11 in which it can be seen that the current increases until a predetermined voltage is reached and thereafter the current is substantially constant. In the curve shown in FIG. 11 it can be seen that initially as the voltage is increased, the $I_p$ curve has a slope which is proportional to the resistance of the channel. However, as the depletion layer approaches the channel thickness, the current becomes more and more constant so that at a predetermined voltage the channel is completely pinched off and the current remains constant regardless of voltage. The pinch-off current $I_p$ is determined by the channel thickness and also by the cannel length. By increasing the channel thickness and decreasing its length, the pinch-off voltage required to obtain a constant current is increased. Conversely by decreasing the channel thickness and increasing its length the pinch-off voltage can be reduced. A construction showing a pinched resistor of the latter type is shown in FIG. 12. With such an arrangement it can be seen that it is possible to provide a pinched resistor which has a very low pinch-off current.

It can be seen from the foregoing that by utilizing pinched resistors incorporating the present invention, it is possible to provide relatively high values of resistance which would be suitable for high voltages as for example 300 volts. The construction of the pinched resistor is such that it is compatible with the steps utilized in making dielectrically isolated integrated circuits. There is only one additional basic step which is required and that is the additional etching step to remove additional portions of the semiconductor body to provide the shallow portion 28*a* of the island which is utilized for the pinched resistor. All the other steps can be carried out simultaneously with the formation of the integrated circuits. For example, the diffusion steps which are required for making the P-type and N= regions in other devices can be used for the pinched resistors.

We claim:

1. In a pinched resistor structure, a support body, at least two semiconductor islands carried by the support body and having a surface, a layer of insulating material surrounding said islands and separating the same from each other and from any other islands and the support body, one of said islands being characterized in that it has one portion at one end which has a depth which is substantially less than the remaining portion of the island, a layer of insulating material disposed on said surface and overlying said one island, said one island being formed of semiconductor material of one type to provide a region of one conductivity type, a region of opposite conductivity type formed in said one island in said region of one conductivity type to provide a dish-shaped PN junction which extends to the surface, said region of opposite conductivity type extending into said one portion and said remaining portion so that the PN junction in said one portion in cooperation with the first named layer of insulating material defines a channel, a contact element extending through said last named layer of insulating material and making contact with said one portion and said region of opposite conductivity type, an additional contact element extending through said last named layer of insulating material and making contact with said remaining portion, voltage means for supplying a voltage across said first named and additional contact elements, and forming a depletion layer in said region of one conductivity type which increases in size and depth as the voltage applied to the contact regions is increased whereby the channel can be pinched off to thereafter permit only a relatively constant current flow regardless of the additional voltage applied to the first named and additional contact elements.

2. A structure as in claim 1 wherein said first named contact element includes a field plate which overlies and extends beyond said region of opposite conductivity.

3. A structure as in claim 2 wherein said last named layer of insulating material is disposed between the field plate and the region of opposite conductivity.

4. A semiconductor structure as in claim 1 wherein said portion of lesser depth is relatively long in proportion to the remainder of the island and has a depth which is relatively shallow in comparison to the length.